United States Patent [19]

Greenleaf et al.

[11] Patent Number: 4,457,625

[45] Date of Patent: Jul. 3, 1984

[54] SELF CALIBRATING CONTOUR MEASURING SYSTEM USING FRINGE COUNTING INTERFEROMETERS

[75] Inventors: Allen H. Greenleaf; John T. Watson, both of Lexington, Mass.

[73] Assignee: Itek Corporation, Lexington, Mass.

[21] Appl. No.: 282,552

[22] Filed: Jul. 13, 1981

[51] Int. Cl.$^3$ .............................................. G01B 9/02
[52] U.S. Cl. ....................................... 356/360; 356/1; 356/4.5
[58] Field of Search .................... 356/1, 4, 4.5, 5, 345, 356/358, 359, 360, 363, 375, 376, 377, 371

[56] References Cited

U.S. PATENT DOCUMENTS

| | | | |
|---|---|---|---|
| 3,601,491 | 8/1971 | Smith-Vaniz | 356/4.5 X |
| 3,633,010 | 1/1972 | Svetlichny | 356/4 X |
| 3,791,739 | 2/1974 | Kawasaki | 356/363 X |
| 3,961,851 | 6/1976 | Gerharz | 356/4 X |
| 4,139,304 | 2/1979 | Redman et al. | 356/358 |

OTHER PUBLICATIONS

Greve et al., "Modulated Laser Surface Surveying System for mm-Wavelength Radio Telescopes", *Proc. SPIE*, vol. 236, pp. 110–112, 1980.

*Primary Examiner*—William L. Sikes
*Assistant Examiner*—Matthew W. Koren
*Attorney, Agent, or Firm*—Homer O. Blair; Robert L. Nathans; Gerald H. Glanzman

[57] ABSTRACT

A measuring arrangement is disclosed for measuring the contour of a two or three dimensional surface in which a redundant configuration of distance measuring systems is positioned above the surface being measured. Each distance measuring system monitors distance measurements to a point proximate the surface as the measuring point is moved across the surface. The distance measurements are taken from a sufficient number of points on the surface such that a sufficient quantity of data is obtained to define the system geometry and also to define the position of each measurement point. The data is transformed by recognized mathematical techniques into the coordinate positions of all of the measured points on the surface.

In one embodiment for measuring the contour of a three dimensional surface, a tetrahedral arrangement of four distance measuring interferometers includes three interferometers positioned in a planar array above the measured surface and a fourth interferometer positioned at a central apex thereof. A retroreflector is placed adjacent to the measured surface to define the measuring point, and is selectively movable across the measured surface. A tetrahedral truss is positioned above the measured surface, and each interferometer has a beam steering head at one corner of the truss to aim the interferometer beam at the retroreflector during movements thereof. Each interferometer further includes a servo control system for controlling the beam steering head to maintain the interferometer beam aimed at the retroreflector.

6 Claims, 7 Drawing Figures

SELF CALIBRATING CONTOUR MEASURING SYSTEM USING FRINGE COUNTING INTERFEROMETERS

The Government has rights in this invention pursuant to Contract No. F30602-76-C-0366 awarded by the Department of the Air Force.

BACKGROUND OF THE INVENTION

1. Field of the Invention

The present invention relates generally to an arrangement for accurately measuring the contour of a three dimensional surface such as a complex optical surface or the contour of a two dimensional surface or line, and more particularly pertains to a self-calibrating, absolute line or surface measuring system using a redundant arrangement of measuring points.

2. Discussion of the Prior Art

In greater detail, the subject invention is concerned in one particular aspect with the present state of the art in the development of computer controlled optical surfacing technology for producing complex shaped optical surfaces, such as infrared quality aspheric mirrors required for future generations of space telescopes, although the teachings herein have a much broader applicability as explained in greater detail below. The further development of this technology depends upon accurate measurements of the optical surface to provide data for surfacing machines which work, as by grinding, the complex optical surface.

In the context of this particular technological field, the development of a measuring arrangement to provide surface measurements as accurately as possible is an essential part of a program to develop a system for surfacing complex optical surfaces such as large aspherics. The measuring arrangement or machine should provide all of the surface data for the fabrication process, at least to the point at which quality interferograms can be produced. If the measuring machine is sufficiently accurate, then even the interferograms, which involve mirror specific special test optics and, in the case of very large mirrors, very large working distances, could possibly be eliminated. A high quality measuring machine could also reduce the measurement part of the fabrication cycle. The more accurate the measuring machine, the more accurate can be the surface grinding, and accordingly the polishing time can advantageously be reduced as a consequence thereof. In the context of this technology, therefore, the measuring machine is an important factor in minimizing the surfacing time, even if its accuracy is not sufficient for final figuring.

One known approach to measuring the contour of a convex or concave surface is to triangulate to a retroreflective target on the surface from a set of three observation points above the surface. In this known approach, triangulation from the three points depends upon an accurate measurement of the distances between the three points and the distances from the three points to the target on the surface. Unfortunately, it is frequently difficult to provide an accurate measurement of these distances.

SUMMARY OF THE INVENTION

Accordingly, it is a primary object of the present invention to provide a self-calibrating, absolute linear or surface contour measuring arrangement using a redundant configuration of distance measuring systems to define the arrangement geometry and also to provide the contour measurements.

A further object of the subject invention is the provision of a measuring system and method of the aforementioned type having at least four distance measuring systems in a polyhedral configuration above a three dimensional surface being measured, and having at least three distance measuring systems in a polygonal configuration above a two dimensional surface being measured.

Yet another object of the present invention is the provision of a system for measuring the contour of a complex optical quality surface which does not require massive, very precise and accurate machinery.

In accordance with the teachings herein, the present invention provides an arrangement in the form of a system and method for measuring the contour of a three dimensional surface, wherein four or more distance measuring systems are positioned in a polyhedral configuration above the measured surface. Each measuring system provides distance measurements to a measuring point proximate the surface as the measuring point is moved across the surface. This arrangement provides a sufficient quantity of measurement data to define both the arrangement geometry and the contour of the three dimensional surface. In the disclosed embodiments the distance measuring systems are differential measuring systems in the form of Laser Unequal Path Interferometers (LUPIs) arranged in a tetrahedral configuration above the measured surface. Although in alternative embodiments the measuring systems could be linear encoders or even absolute interferometers which operate with several different frequencies of light.

In greater detail, the tetrahedral arrangement includes three interferometers positioned in a planar array above the measured surface and a fourth interferometer positioned at a central apex thereof. Moreover, a retroreflector is placed adjacent to the surface to define the measuring point, and is selectively movable across the measured surface.

In one disclosed embodiments a single laser source provides laser beams for all four of the interferometers, although in alternative embodiments each interferometer might have a separate laser. A tetrahedral truss is positioned above the measured surface, and each interferometer has a beam steering head at one corner of the truss to aim the interferometer beam at the retroreflector during movements thereof. Each interferometer further includes a servocontrol system for controlling the beam steering head to aim the interferometer beam at the retroreflector.

The present invention also provides a method of determining the contour of a three dimensional surface wherein the distance measurements are taken from at least ten points on the surface and preferably more such that a redundant quantity of data is obtained to defined the system geometry and minimize the effects of measuring errors. The redundant quantity of data is then transformed by recognized mathematical techniques into the coordinate positions of the points on the surface.

The present invention also provides an arrangement for measuring the contour of a two dimensional surface or line wherein three or more distance measuring systems are positioned in a polygonal configuration above the surface. Each measuring system provides distance measurements to a measuring point proximate the surface as the measuring point is moved along the contour of the surface. The arrangement provides a sufficient quantity of measurement data to define both the arrangement geometry and the contour of the surface. In this embodiment also, the distance measuring systems are differential distance measuring systems in the form of LUPIs measuring changes in the position of a retroreflector which is movable along the surface. The aforementioned comments regarding alternative measurement systems, and data processing and transformation in respect to a three dimensional surface measuring system are also applicable to this two dimensional measuring arrangement as well.

BRIEF DESCRIPTION OF THE DRAWINGS

The foregoing objects and advantages of the present invention for a surface contour measuring arrangement may be more readily understood by one skilled in the art with reference being had to the following detailed description of several preferred embodiments thereof, taken in conjunction with the accompanying drawings wherein like elements are designed by identical reference numerals throughout the several drawings and in which.

DETAILED DESCRIPTION OF THE DRAWINGS

Figure 1:
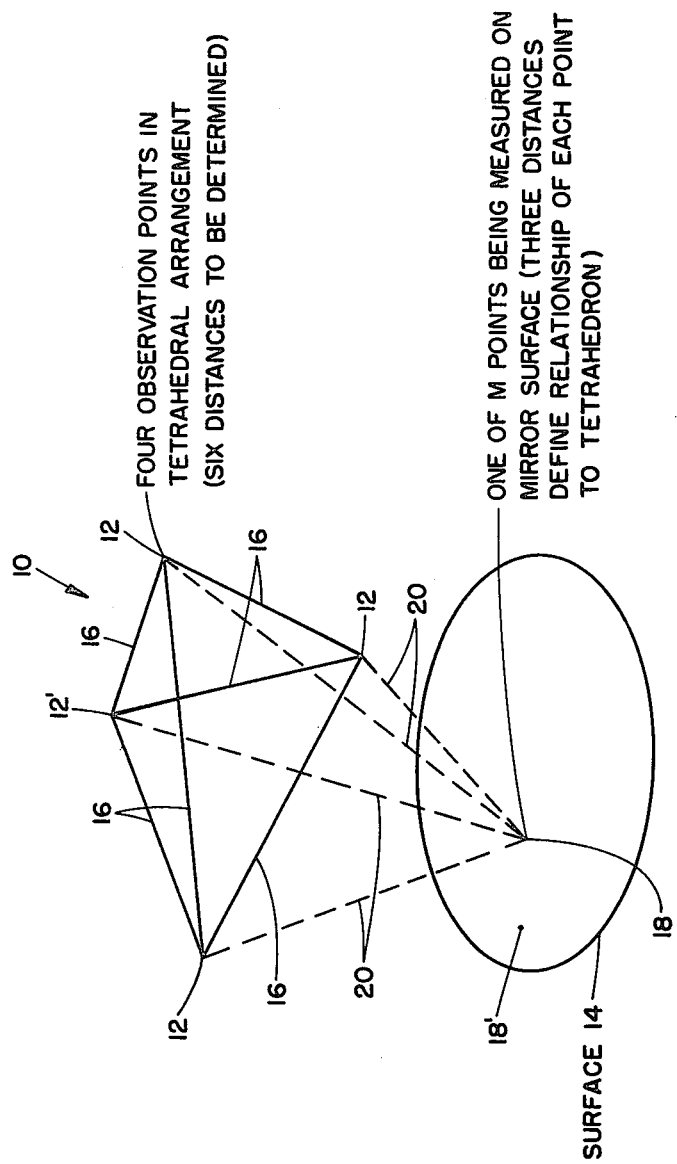
FIG. 1 illustrates geometrically a tetrahedral arrangement of four observation points above a surface, the contour of which is being measured.

Referring to the drawings in detail, FIG. 1 illustrates the geometry involved in a tetrahedral arrangement 10 of four observation points 12 above a surface 14, the contour of which is being measured pursuant to the teachings herein. The tetrahedron 10 comprises three corner observation points 12 which are coplanar in a substantially horizontal plane above surface 14 and a raised central apex observation point 12'. The tetrahedron may be precisely defined by the lengths of its six sides 16. The relative distance measurement paths between each of the observation points 12 and a surface point 18 on surface 14 are illustrated at 20.

Figure 3:
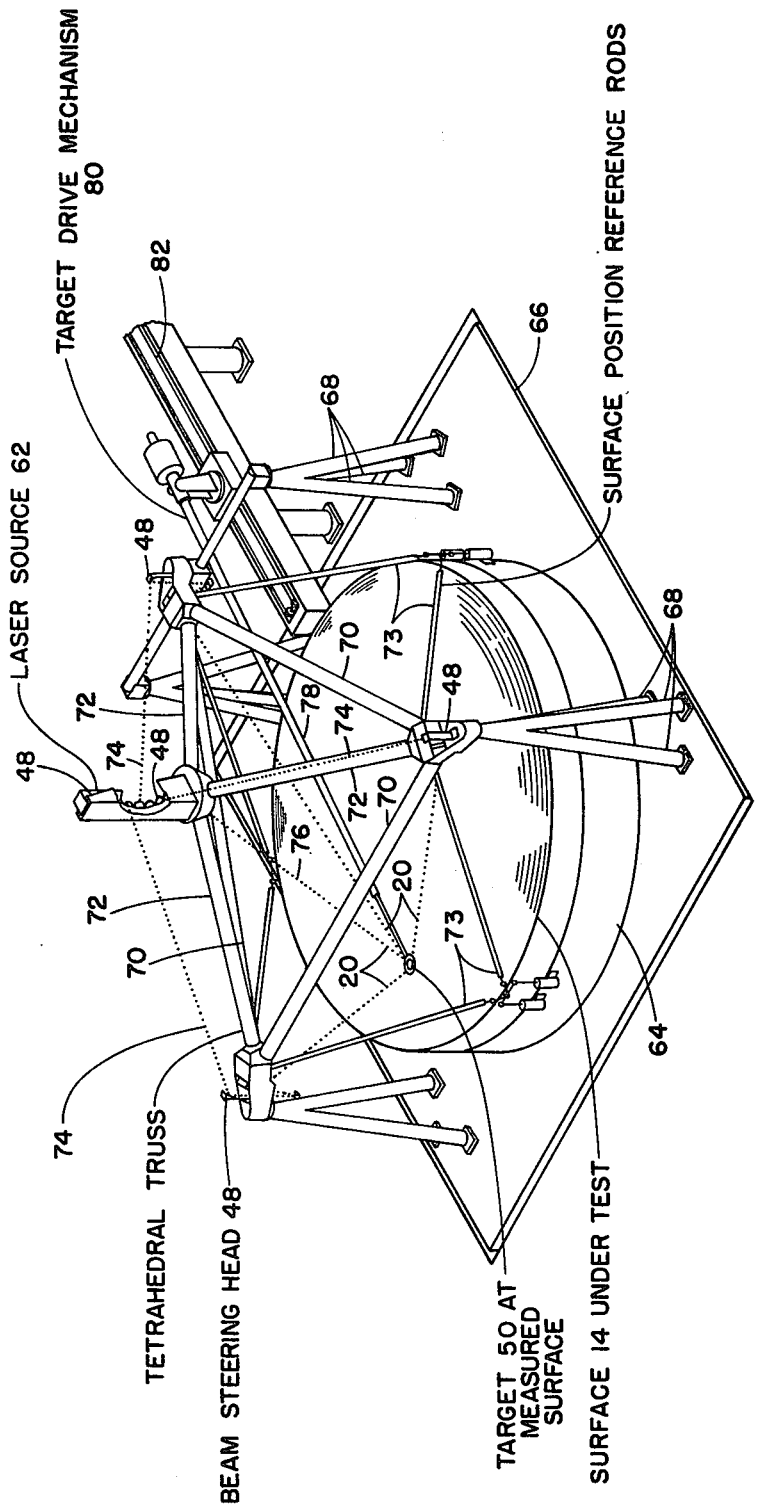
FIG. 3 is a perspective view of an exemplary embodiment of a surface contour measuring machine constructed pursuant to the teachings of the present invention.

In a surface measuring machine as illustrated in FIG. 3, changes in the distances 20 between one surface point 18 and a second surface point 18', which can be anywhere on the surface 14, are measured interferometrically. However, in alternative embodiments other types of distance measuring systems could be used as well, such as a linear encoder or a different type of interferometer such as an absolute interferometer which operates with several different frequencies of light.

Figure 2:
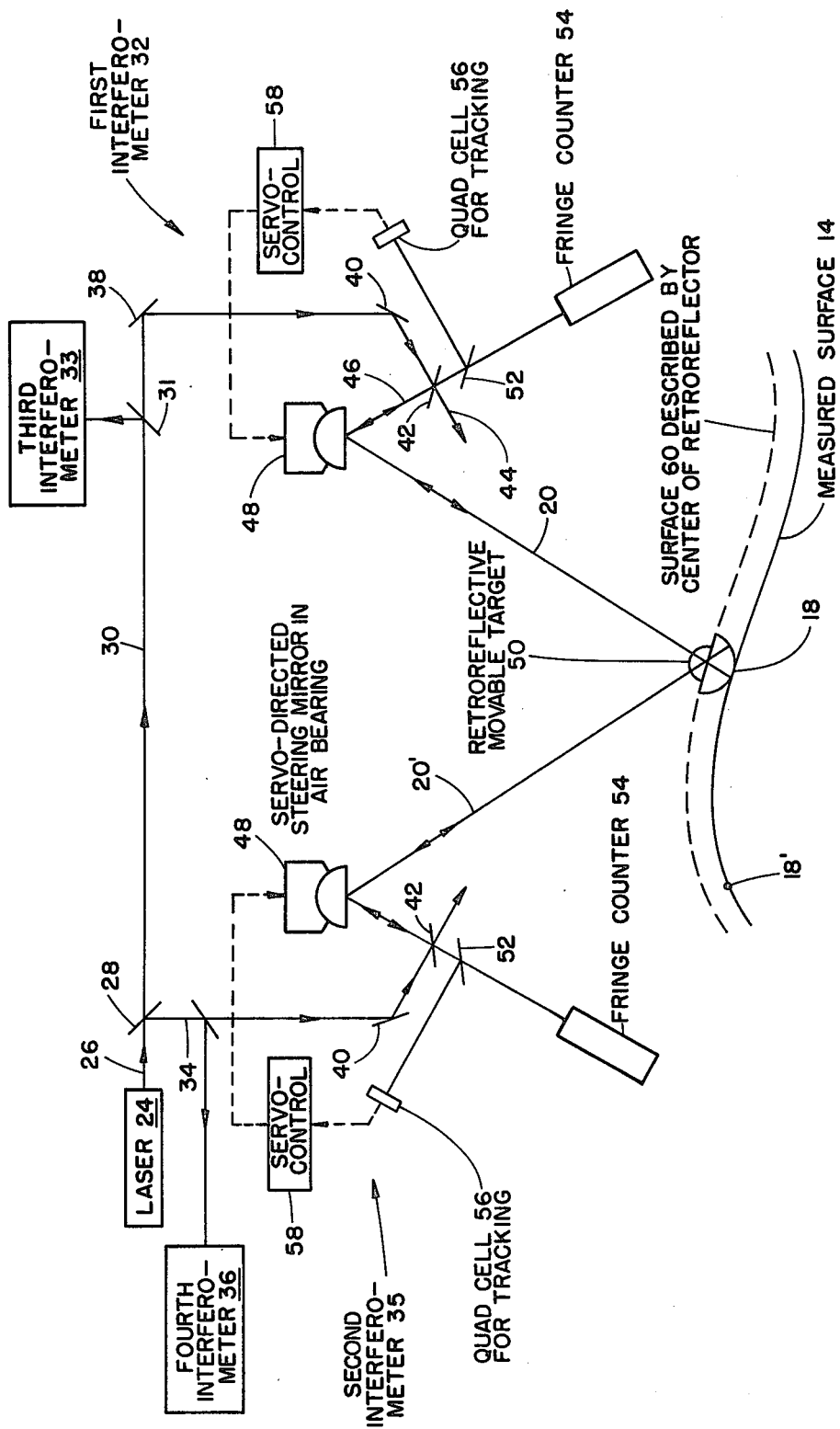
FIG. 2 shows a schematic arrangement of four tracking laser differential distance measuring interferometers which may be utilized within the context of the subject invention.

FIG. 2 illustrates a schematic arrangement of four differential distance measuring interferometers which include a common laser 24 for generating a coherent, collimated laser beam 26 which is directed to a first beam splitter 28. Beam splitter 28 transmits a first beam 30 to first and third interferometers 32 and 33, and reflects a second beam 34 to second and fourth interferometers 35 and 36. Beam 30 is incident upon a second beam splitter 31 which transmits a portion thereof to a first interferometer 32 and reflects a portion thereof to a third interferometer 33, which is similar to the first and second interferometers illustrated in FIG. 2.

The transmitted portion of beam 30 is redirected by first and second stationary mirrors 38 and 40 to a stationarily mounted beam splitter 42. A portion of the beam 44 passes through the beam splitter 42 and is not utilized further, while a second portion of the beam 46 is reflected by the beam splitter 42 to a servo controlled beam director 48, which may be a steering mirror, to redirect the beam along a distance path 20 to a retroreflector movable target 50 positioned on a surface measuring point 18. The beam director 48 can be a servo controlled hemisphere mounted on an air bearing in a manner such that rotation of the hemisphere about two axes steers the beam in two directions but does not change the distance along a distance path 20. The target 50 retroreflects the beam back to beam director 48, which redirects the beam back onto beam splitter 42. This results in an interference pattern thereof formed between the incoming beam 30 and the beam which has traversed between beam director 48 and target 50 and back again. The interference pattern and the beam returning from beam director 48 pass to a further beam splitter 52 which directs a first portion thereof to a fringe counter 54 and a second portion to a quad cell 56 for tracking.

Quad cell 56 may be a commercially available cell having four symmetrically mounted photodetectors thereon which produce four signals of equal amplitude when beam director 48 precisely aims the incoming laser beam onto retroreflector 50. However, if beam director 48 does not aim the beam precisely at retroreflector 50, the amplitudes of the four signals become symmetrically imbalanced in proportion to the aiming error. The resultant imbalanced signals are utilized in a feedback servo loop 58, in a known manner, to control beam director 48 to re-aim the beam precisely at retroreflector 50.

Fringe counter 54 examines the interference pattern to count fringe changes in a manner known in differential distance measuring interferometers. If target 50 is stationary relative to beam director 48, fringe counter 54 sees a stationary interference pattern and accordingly produces mo output counting pulses. However, any relative movement between target 50 and beam director 48 results in fringes passing by the fringe counter, and the number of the count is directly proportional to the magnitude of the movement, in a manner as is known in the interferometry arts. Knowing the wavelength of the laser beam allows a precise calculation of the magnitude of the differential movement, while standard phase displacement techniques allow the sign of the movement to be ascertained. Interferometers of this nature are commercially available for instance from Hewlett Packard.

Accordingly, as target 50 is moved from a first surface measurement point 18 to a second surface measurement point 18', the first differential distance measuring interferometer 32 precisely measures the change in the length of path 20, while the quad cell 56 and servocontrol 58 control beam director 48 to maintain the beam aimed precisely at the movable or stationary retroreflector 50.

The surface 60 actually described by the center of the retroreflector is positioned above the surface 18 by an amount dependent upon the physical characteristics of the retroreflector, but surface 60 is parallel to, and mathematically analagous and transformable to the surface 14 being measured.

The second interferometer 35 operates in a manner similar to the first interferometer 32 to measure any change in its corresponding path length 20', and like elements therein are numbered in accordance with elements of the first interferometer 32. The third and fourth interferometers 33 and 36 also operate in a manner similar to the illustrated first and second interferometers. With this arrangement of four interferometers, any changes in the lengths of the four distance paths 20 in FIG. 1 may be precisely measured interferometrically. Although this embodiment illustrates one laser supplying the measuring beams for all of the interferometers, alternative embodiments might have a separate laser for each interferometer or some other arrangement.

The contour of a curved surface can be measured by triangulating to a retroreflective target on the surface from a set of three observation points above the surface. This technique requires an accurate measurement of the distances between the three points and the distances from the three points to the measuring point on the surface. Triangulation from three points would be sufficient if the distances between the three points and the distances from the three points to a single point on the surface were accurately known. Adding a fourth observation point to form a tetrahedral arrangement 10 above the surface, as taught by the present invention, results in a redundant measurement. As the retroreflector is moved about the surface and the changes in the distances from the observation points are measured, a sufficient amount of data is taken such that the dimensions of the tetrahedron and its position relative to the measured surface can be precisely calculated. By totalling the measurements and the unknowns, it appears that after ten measurements all of the necessary dimensions can be readily determined, as discussed in further detail below, although preferably more than ten measurements are taken to minimize the effects of measuring errors.

During the course of the measurement process in which the retroreflector is moved about the surface, the dimensions of the tetrahedron must either be maintained constant or monitored. A total of twelve dimensions must be maintained constant or monitored, six of the tetrahedron and six measurements to define the positions relative to each other. Although theoretically the system unknowns can be determined after ten measurements, errors in the determination of the system or arrangement parameters resulting from noisy measurements will continue to diminish as more and more data points are added to the surface. In measuring optical surfaces a normal measurement could consist of an array of points with 50 to 100 points across the diameter, or between 2,000 and 8,000 points on a round mirror. A computer simulation of this arrangement indicates that after about 200 points have been measured, the surface error has about the same rms value as the rms error in measurement of a single interferometer beam.

In a simplified embodiment as illustrated in FIG. 3, three dimensions are fixed by using graphite/epoxy or invar struts or metering rods. In this embodiment, a single laser 62 serving steerable interferometers, each having a distance measuring path 20 and a servo-directed steering mirror 48, at the four observation points is used to make the measurements to the retroreflector 18 on the measured surface.

In an alternate embodiment, the twelve reference dimensions can be monitored interferometrically, bringing the number of interferometers to sixteen. The arrangement in this case could include four lasers, one for each of the four observation points and serving three fixed and one steerable interferometer, although theoretically one sufficiently powerful laser could supply measuring beams to all of the interferometers.

There are several design considerations in the areas of the steerable interferometers and the moving retroreflector. At least two forms of interferometers are known in the art which have no path length changes associated with errors in the steering mirror bearings. The laser beams should be directed substantially to the center of the target retroreflector because the distance being measured is that along directions normal to the wavefront. Therefore an automatic tracking or centering device, deriving signals from the return beam as illustrated in FIG. 2, is probably required in a practical embodiment to avoid beam interruption resulting in loss of fringe counts. The moving retroreflector 18 must also be defined in its relationship to the measured surface. A retroreflector floating on an air film with a noncontacting probe to monitor its exact height above the measured surface would be ideal in many embodiments. In other variations a mechanically contacting retroreflector might be utilized instead.

Referring to FIG. 3, a measured surface 14 in the form of a large mirror surface is positioned substantially horizontally on a fabrication mount 64 which is in turn mounted on an isolation block 66 to substantially isolate the measuring arrangement from ambient vibrations and noises. Although somewhat massive noise isolation equipment is illustrated in FIG. 3 because such equipment is traditional in the art of measuring optical quality surfaces, one advantage of the present invention appears to be that such traditional noise isolation equipment can be eliminated if measurement accuracy requirements do not dictate their usage. Each of the three servo directed steering mirrors 48 at the three planar observation points 12 is supported by three tripod mounted graphite epoxy truss members 68. The three tripod assemblies support a tetrahedral truss formed of three horizontally extending base members 70 and three members 72 which extend to the central raised apex observation point 12'. An additional set of six surface position reference rods 73 is provided extending between the tripod assemblies and the measured surface 14 to provide stability for the arrangement or to further monitor movements thereof. The reference rods 73 may also be formed of graphite/epoxy.

The laser beam from laser source 62 is split, as by beam splitters similar in concept to elements 28 and 31, into three fixed beams 74 directed at the three servo controlled steering mirrors 48 on top of the three tripod assemblies, and one steerable beam 76, directed by a servo-controlled steering mirror 48 mounted at the raised apex observation point. Accordingly, this arrangement has four steerable interferometers arranged along the four distance measuring paths 20 to provide the requisite relative distance measurements.

The retroreflective target 50 is selectively movable on the surface 14 by a rod 78 coupled to a target drive mechanism 80, movable along a track 82, such that the measurements from one surface point 18 to a second surface point may be conveniently controlled and even partially automated. In practice, the counts from the four fringe counters for the four interferometers would be digitally stored in a computer memory, and the computer can then reduce the data to a profile of the surface 14 by using known mathematical techniques as follows.

Once data is accumulated from a sufficient number of measurement points 18, it must be reduced to convert the distance measurements made by the four differential distance interferometers to x, y, and z coordinates of the target at each measurement point. It should be remembered that an inherent characteristic of a differential distance measuring interferometer, such as those which are commercially available from Hewlett Packard, is that it measures the distance traversed by a retroreflective target along the direction of the laser beam, but it does not determine the absolute distance of the target from the interferometer.

The conversion of the interferometrically obtained data into x, y, and z coordinates of each measuring point can be approached mathematically by using many different techniques, one of which will now be explained herein. The first distance measurement made in a series of measurements is given a value of zero or an arbitrary value. One output of the data reduction for this measurement system is the actual offset to be added to each measurement to determine the actual distance from the steering point for the laser beam (the corner of the tetrahedron) to the retroreflective target. For the measurement of a surface, therefore, there are four such constants to be determined, one for each of the four measurement heads at the corners of the tetrahedron. Another output of the data reduction process is the actual lengths of the sides of the tetrahedron. There are six such lengths to be determined.

Figure 4:
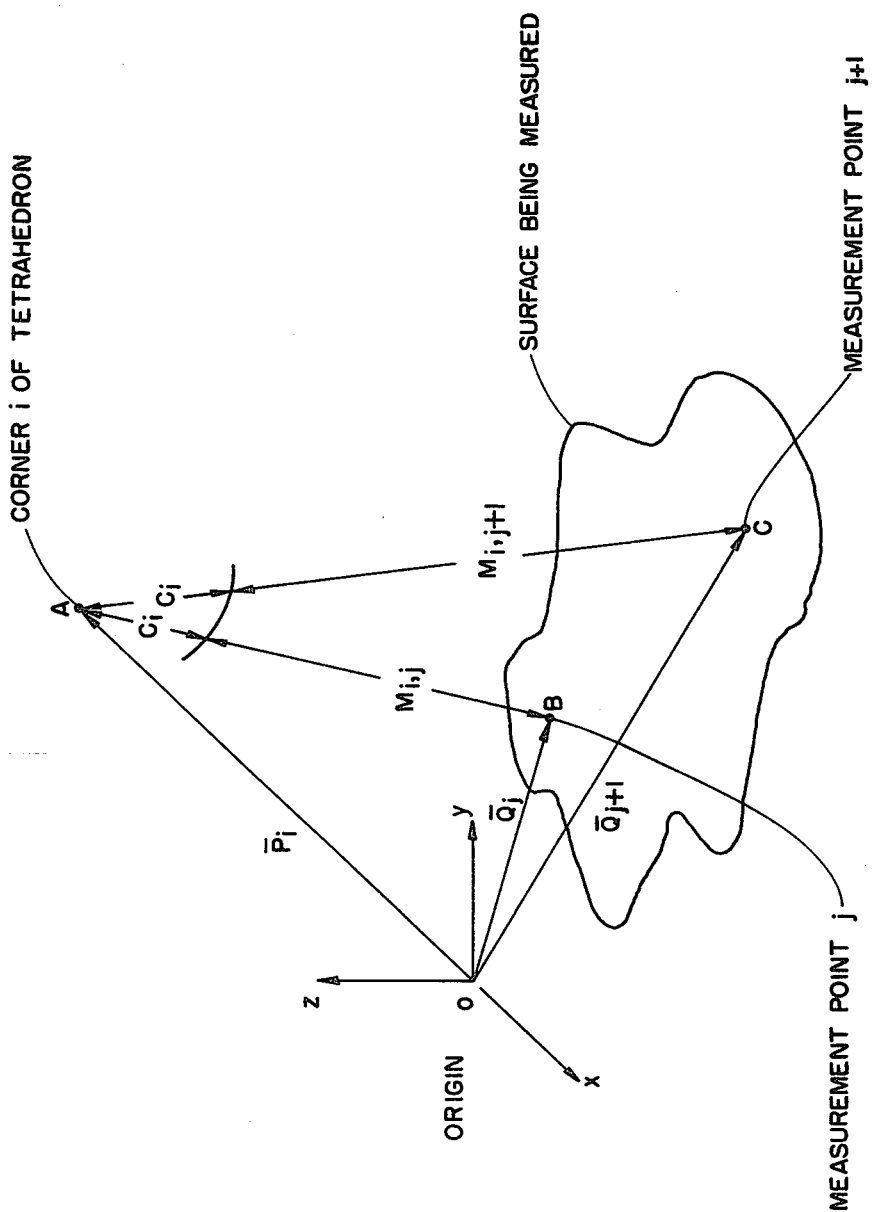
FIG. 4 is an illustration of some of the mathematical considerations concerning reduction of the accumulated data into distance measurements herein.

FIG. 4 illustrates a space within an x, y, z coordinate system with origin at point 0. Within this space, point A is the $i^{th}$ of the four corners of the tetrahedron, one of the four laser beam steering points. The position of this point in space is designated by the vector from the origin $\bar{P}_i$, which is to be determined. Point B in FIG. 4 is the $j^{th}$ measurement point on the surface being measured at which the retroreflective target is placed. The position of point B is designated by vector $\bar{Q}_j$ from the origin, which is also to be determined. The actual distance between points A and B can be determined from the vector difference $\bar{P}_i - \bar{Q}_j$ and is simply the absolute value of the resultant vector.

When the retroreflective target is at position B, the measured distance from the interferometer is the scalar $M_{i,j}$. The value of $M_{i,m}$ differs from the actual distance between points A and B by an amount $C_i$, which is the unknown constant length to be added to the measurement to each target position from point A.

When the retroreflective target is moved to $(j+1)^{th}$ measurement point, which is point C in FIG. 4, the target position is now specified by the vector $\bar{Q}_{j+1}$ from the origin, and the actual distance from point A to point C is the absolute value of the vector difference $\bar{P}_i - \bar{Q}_{j+1}$. The measured distance from the steering point is the scalar $M_{i, j+1}$, which also differs from the actual distance between points A and C by the amount $C_i$.

In the case of ten measurement, then, the problem to be solved is the determination of the $\bar{P}$'s, $\bar{Q}$'s and $C$'s so that for the set of measured $M$'s.

$$|\bar{P}_i - \bar{Q}_j| - M_{ij} + C_i = 0$$

Generally, many more than ten points would be measured to define a surface, and it would be desirable to use all of the measurement data in determining the best estimate of the $\bar{P}$'s, $\bar{Q}$'s and $C$'s in the presence of measurement errors. The solution obtained does not give zero for the above expression for more than ten points unless there is zero measurement error.

One approach to the formation of a solution with the effects of measurement errors spread among the various measurement points is to require that $$\Sigma_{ij}(|\bar{P}_i - \bar{Q}_j| - M_{ij} + C_i)^2 = \text{minimum}$$

This is now a least squares minimization problem that can be solved iteratively by standard least squares minimization computer algorithms.

Figure 5:
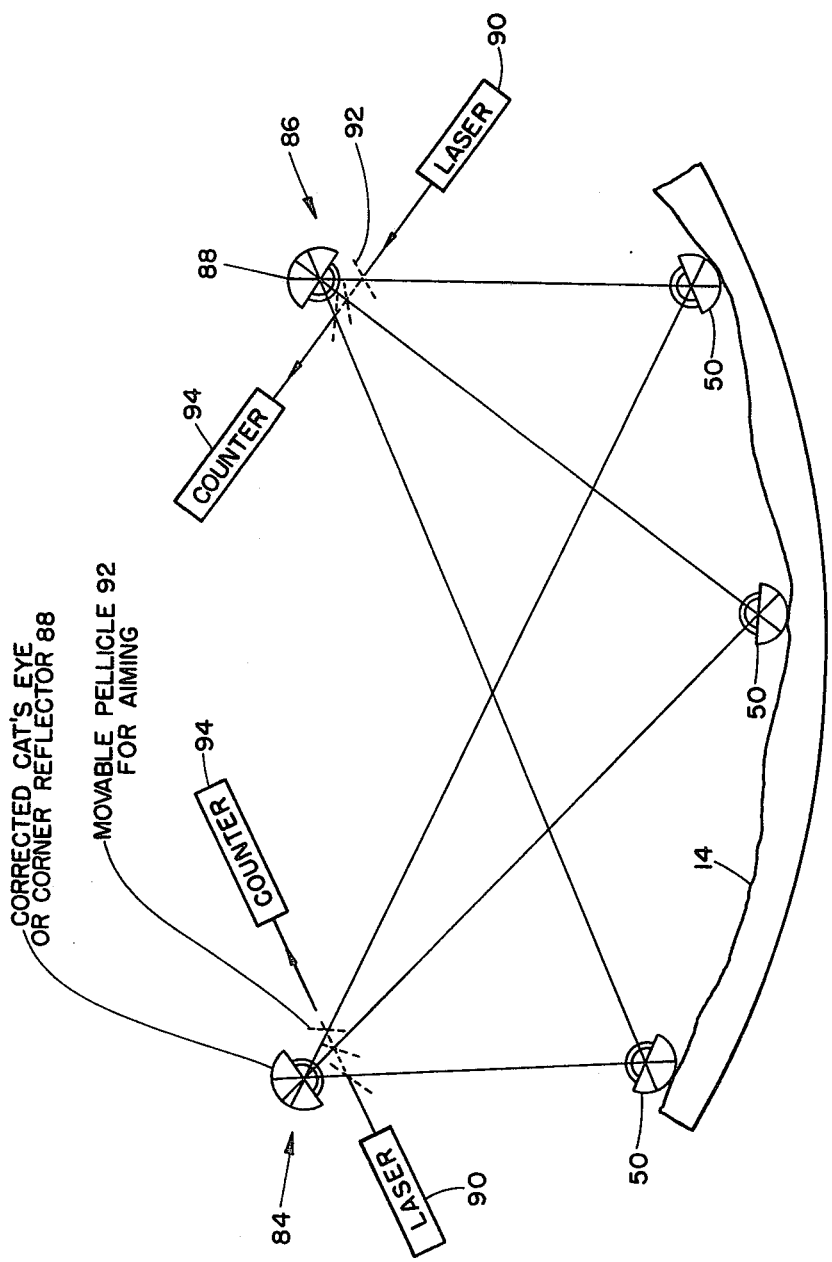
FIG. 5 is a schematic illustration of two distance measuring interferometers utilizing corrected cat's eye retrorelectors.

FIG. 5 is a schematic illustration of two interferometers 84 and 86, each of which incorporates a further corrected cat's eye or corner cube reflector 88, which may also be utilized pursuant to the teachings herein. In these arrangements a beam from a laser source 90 is directed onto a movable pellicle 92 for steering of the measurement beam. The pellicle reflects a portion of the beam to retroreflector 84 which then directs it to the retroreflector 50 which in turn reflects the beam back to pellicle 92 to form an interference pattern thereon between the original laser beam and the beam which has passed between the retroreflectors. A fringe counter 94 then counts any pattern fringes moving thereacross, in a standard manner as is known in differential distance measuring interferometry.

Figure 6:
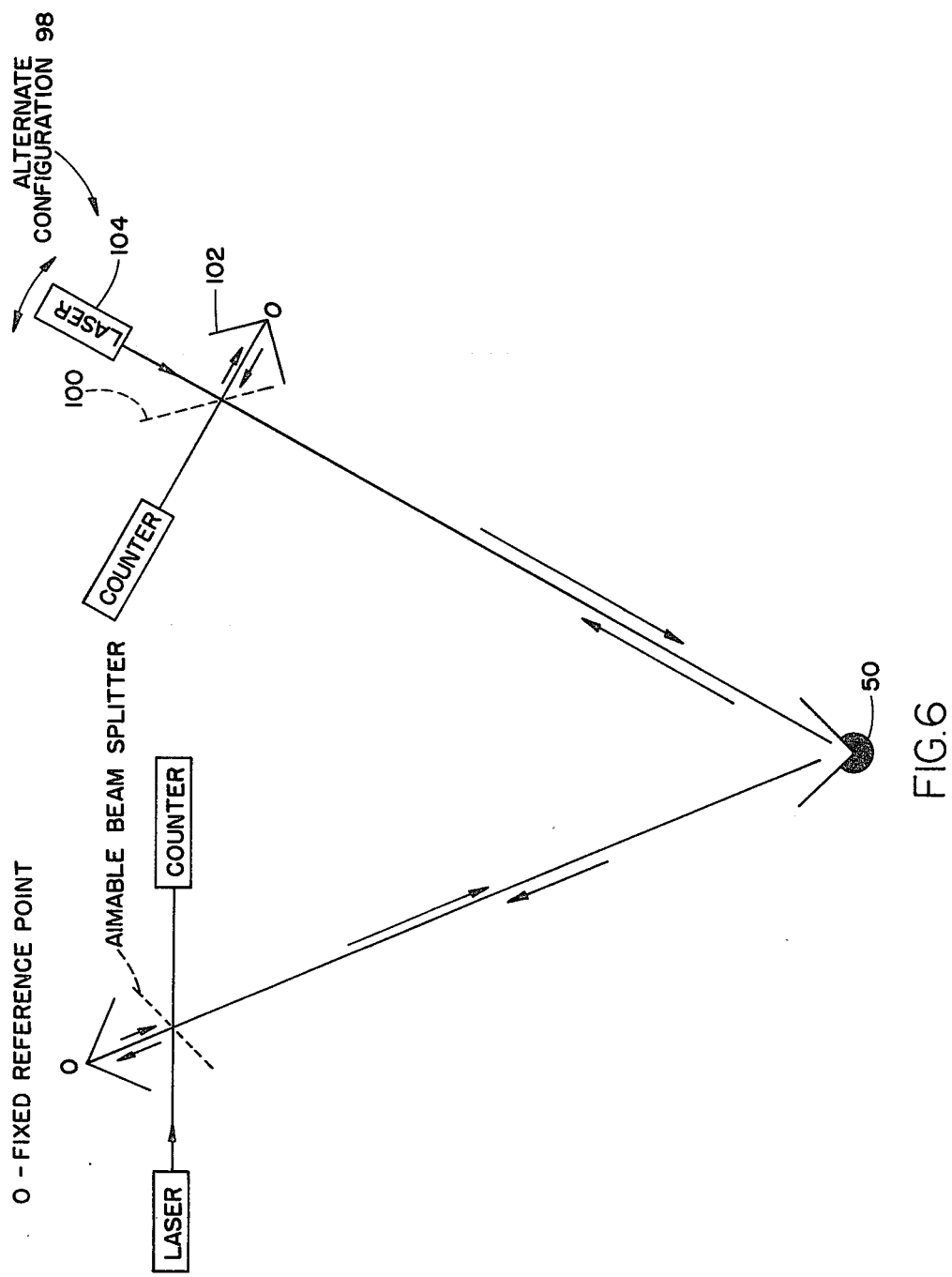
FIG. 6 illustrates two different embodiments of interferometer heads which may be utilized in the several embodiments disclosed herein.

FIG. 6 illustrates on the right side thereof a further configuration 98 for an interferometer head wherein a pellicle 100 and corner cube reflector 102 are stationary and fixed relative to the measuring arrangement, and laser 104 is pivotally mounted to direct the laser beam onto retroreflector target 50. A quad cell, similar in concept to cell 56 in FIG. 2, is utilized to control movement of the laser for tracking purposes.

Figure 7:
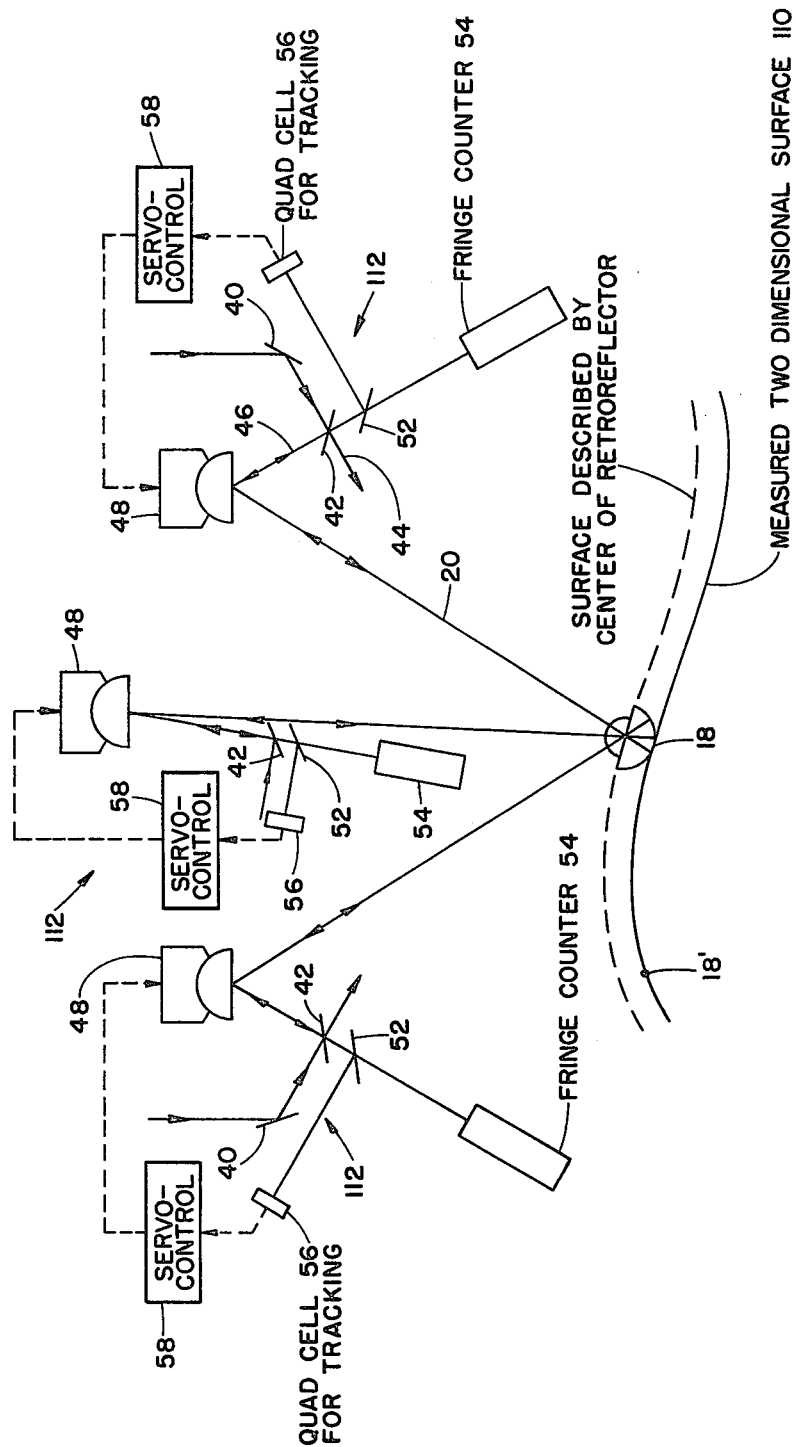
FIG. 7 is a schematic illustration of an arrangement, having three distance measuring interferometers therein, for measuring the contour of a two dimensional surface.

FIG. 7 is a schematic illustration of an arrangement for measuring the contour of a two dimensional surface 10 which has at least three measuring systems 112 thereabove. Each measuring system includes an interferometer arranged in a manner similar to that of the embodiment of FIG. 2, and accordingly the various elements thereof are numbered the same and the operations thereof will not be repeated herein.

This embodiment is similar in concept to those explained with respect to the measurement of the contour of a three dimensional surface with the following additional explanation. It is known that the contour of a two dimensional surface or line can be measured by triangulating to a number of target points on its surface from a set of two observation points above the surface. In this known prior art approach, successful triangulation from the two observation points depends upon an accurate measurement of the distance between the two observation points and the distances from the two observation points to the measurement point(s). Unfortunately, it is frequently difficult to provide an accurate measurement of all of these distances.

Accordingly in accordance with the teachings herein, the contour of a two dimensional surface or line is measured by an arrangement of three or more distance measuring systems positioned in a polygonal configuration above the measured surface. In accordance with the embodiment of FIG. 7, the polygonal shape is triangular and is coplanar with the two dimensional measured surface. Accordingly, this embodiment differs from the known prior art triangulation approach by the addition of a redundant measuring point, which results in a sufficient amount of measurement data, after several measurements, to define both the system geometry, in terms of the triangular measurement array, and the contour of the measured two dimensional surface in a manner analagous to that explained with respect to the three dimensional surface measurement arrangements.

While several embodiments and variations have been described in detail herein, it should be apparent that the teachings and disclosure of the present invention will suggest many other embodiments and variations to those skilled in this art. For instance, although the present invention has been described in context with the measurement of an optical surface, the teachings herein are equally applicable to the measurement of the contour of any appropriate surface such as the measurement of the surfaces of various models.

What is claimed is:

1. A system for measuring the contour of a three dimensional surface, comprising an arrangement of at least four distance measuring systems positioned in a polyhedral configuration above a surface to be measured, with each measuring system providing distance measurements to a measuring point proximate the surface as the measuring point is moved across the contour of the surface, to provide a sufficient quantity of measurement data to define the system geometry and the contour of the three dimensional surface, each distance measuring system including a differential distance measuring system utilizing an interferometer, said polyhedral configuration including a tetrahedral configuration of three interferometers positioned in a planar array above the measured surface and a fourth interferometer positioned at a central apex of the tetrahedral configuration, and further including a tetrahedral truss positioned above the measured surface, each interferometer having a beam steering head at one corner of the truss to aim an interferometer beam at the measuring point during movements thereof across the contour of the surface.

2. A system for measuring the contour of a three dimensional surface, comprising an arrangement of at least four distance measuring systems positioned in a polyhedral configuration above a surface to be measured, with each measuring system providing distance measurements to a measuring point proximate the surface as the measuring point is moved across the contour of the surface, to provide a sufficient quantity of measurement data to define the system geometry and the contour of three dimensional surface, each distance measuring system including a differential distance measuring system utilizing an interferometer and each interferometer having a beam steering head for directing an interferometer beam at the measured point during movements thereof across the contour of the surface.

3. A system for measuring the contour of a three dimensional surface as claimed in claim 1 or 2, each interferometer including a servocontrol system controlling the beam steering head to aim an interferometer beam at the measured point during movements thereof across the contour of the surface.

4. A system for measuring the contour of a two dimensional surface, comprising an arrangement of at least three distance measuring systems positioned in a polygonal configuration above a two dimensional surface the contour of which is being measured, with each measuring system providing distance measurements to a measuring point proximate the surface as the measuring point is moved along the contour thereof, to provide a sufficient quantity of measurement data to define the system geometry and the contour of the surface, each of said at least three distance measuring systems including a differential distance measuring system utilizing an interferometer, and including a retroreflector adjacent the surface defining the measuring point and being selectively movable across the contour of the surface, each interferometer having a beam steering head for directing an interferometer beam at the measured point during movements thereof across the surface.

5. A system for measuring the contour of a two dimensional surface, comprising an arrangement of at least three distance measuring systems positioned in a polygonal configuration above a two dimensional surface the contour of which is being measured, with each measuring system providing distance measurements to a measuring point proximate the surface as the measuring point is moved along the contour thereof, to provide a sufficient quantity of measurement data to define the system geometry and the contour of the surface, each of said at least three distance measuring systems including a differential distance measuring system utilizing an interferometer, and including a retroreflector adjacent the surface defining the measuring point and being selectively movable across the contour of the surface, together with a single laser source for providing laser beams for all of the interferometers, each interferometer having a beam steering head for directing an interferometer beam at the measured point during movements thereof across the surface.

6. A system for measuring the contour of a two dimensional surface as claimed in claim 5, each interferometer including a servocontrol system controlling the beam steering head to aim an interferometer beam at the measured point during movements thereof across the surface.

* * * * *